Jan. 23, 1968     S. E. CAPELL     3,365,687
CORE JOINT HAVING LOCKING WEDGES
Filed Nov. 12, 1964
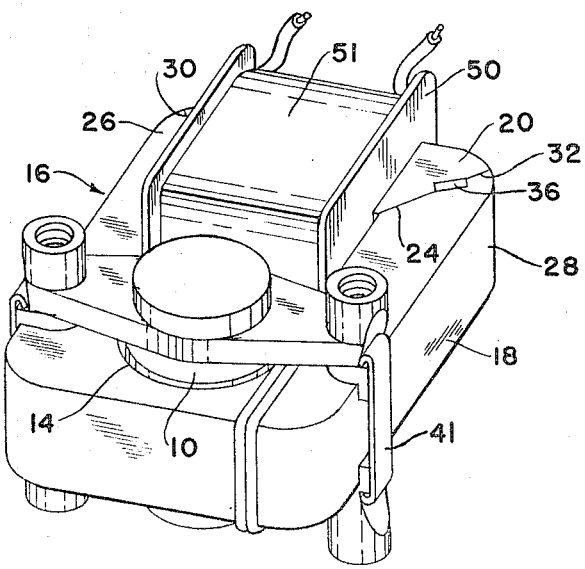
FIG. 1
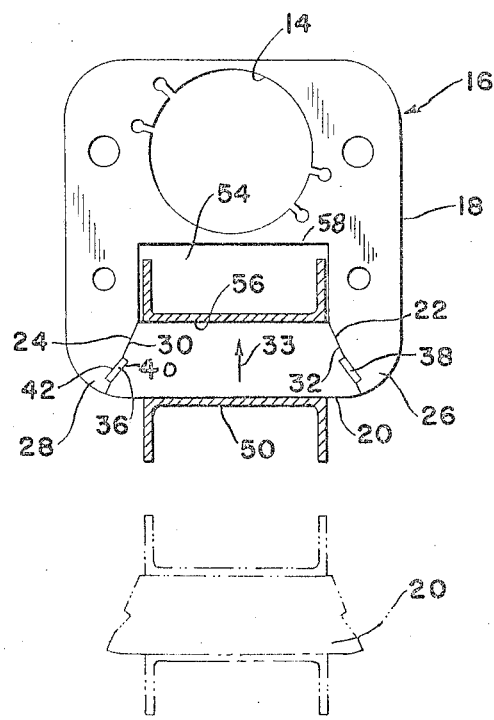
FIG. 2
FIG. 3
INVENTOR.
SIDNEY E. CAPELL
BY
ATTORNEY

United States Patent Office 3,365,687
Patented Jan. 23, 1968

3,365,687
CORE JOINT HAVING LOCKING WEDGES
Sidney E. Capell, Elyria, Ohio, assignor to The General Industries Company, Elyria, Ohio, a corporation of Ohio
Filed Nov. 12, 1964, Ser. No. 410,799
7 Claims. (Cl. 336—210)

This invention relates to new and improved magnetic cores and to the process for producing such improved cores.

There have been numerous efforts at manufacturing a mechanically interlocked two-part magnetic core, the principal method involving mortising or interlocking by dove-tailed joints, the component parts of the magnetic core. One typical method of manufacture is that shown in U.S. Patent No. 2,330,824 to Granfield, "Method of Making Magnetic Cores," issued Oct. 5, 1943, in which a dove-tail projection is used to interlock with a complementary key indentation. Other prior art methods of mechanically interlocking multicomponent parts of a core are generally unreliable because the two parts become loosened and are unreliably locked together. Also, the described prior art methods for joining the component parts lack a quick and ready method for assembly and disassembly during the manufacture and subsequent service of the motor. Consequently, a mechanical lock expedient for the manufacture of electric motors has not proved satisfactory for the most part.

It has been found that where multi-components are used for fabricating an electric motor there is a tendency to increase the magnetic reluctance in the core because the grain structure of the interlocking components tends to disrupt the flow of magnetic flux lines thereby increasing the reluctance. Also, the mechanical connection tends to hold the parts together somewhat loosely and the resulting air gaps also contribute to an increased magnetic reluctance.

It is, therefore, one of the principal objects of the present invention to provide a new and improved process for producing a magnetic core from two or more components in which the components are readily and reliably fastened together and detachable one from the other to permit subsequent servicing.

It is also an object of the present invention to provide a new and improved joint connection between multi-components which make up a core construction and in which the joint has a tight and reliable securement, in which the parts of the members are held in close face-to-face relation thereby reducing magnetic reluctance.

One of the important features of the present invention is that the joint connection between the pars maintains the parts together in intimate relation with the surfaces being held tightly together until the locking members are removed.

A still further object of the present invention is to product a process for fabricating core constructions in which one of the components is readily installed and removed and ensures that the component parts are rigidly and tightly locked together to maintain magnetic reluctance at a low value particularly in the joints of the core construction.

Other objects and features of the present invention will become apparent from a consideration of the following description which proceeds with reference to the accompanying drawings, wherein:

FIGURE 1 is an isometric view of a finished motor construction having a core constructed in accordance with the present invention;

FIGURE 2 is a plan view of the core with the armature and coil removed, and showing the components in dotted line position prior to assembly and in full line position subsequently to assembly; and, FIGURE 3 is an enlarged detail view of a locking pin for effecting assembly of the two components of the core.

Referring now to the drawings, the motor comprises a rotatable armature 10, the armature 10 being mounted for rotation within an opening 14 of a core 16 which is comprised of two components, the one 18 which is U-shaped and forms an incomplete loop structure and the other component 20 which is dimensioned to fit between ends 22 and 24 of the legs 26 and 28 respectively of the component 18. The ends 22 and 24 are preferably angularly divergent to form a miter connection with similarly formed angularly diverging tapered surfaces 30, 32 of component 20. The two components 20 and 18 are held together by forcing component 20 in the direction of the arrow 33 whereby the tapered surfaces at the adjoining ends of component 18 and 20 are closely fitted together into operative relation.

To hold the components in their nested operative relationship locking members 36 and 38 preferably tapered are driven endwise into generally rectangular openings formed by matching complementary generally L-shaped notches 40, 42 in the respectively confronting faces of the component 20 and adjacent of the legs 26, 28. The notches 40, 42 are undersized with respect to the dimension W of the locking members 36, 38 so that when the locking member 36 is driven endwise into the opening provided by the notches 40, 42 the component 20 is forced in the direction of the arrow 33 and becomes more tightly wedged between the legs 26, 28.

As long as the locking member 36 is held in such wedged engagement, it is virtually impossible to dislodge either of the components 18, 20 and the adjoining mitered surfaces 24, 30 and 22, 32 are held in intimate flat face engagement undisturbed. The magnetic reluctance at the joints between the components 18, 20 is thus markedly reduced to a minimum. The flow path for the magnetic lines of force is unimpeded by reason of the absence of air gaps and the mitered surfaces tend to channel the magnetic flux lines with minimum impedance.

The locking members 36, 38 are preferably non-metallic members and are preferably formed of any suitable thermo-setting resin construction, which is commonplace in the electrical industry, such as phenol formaldehyde, urea melamine and other such similar resin compositions. The invention is not, however, limited to a specific material of construction and may also include metallic structures, but the preferred embodiment is a non-metallic construction.

It is possible to control the degree of wedging by controlling the angle of wedge between the confronting surfaces 24 and 32. Thus, the angle can be made more acute, i.e., more flat faced between 24 and 32, or the openings 40, 42 can be varied therein, and in the process of so doing alter the wedging angle. Once the wedging angle is established, the size of the locking member 36 is determined, as well as its preferred taper from end to end along the dimension W, which may be varied, so that in the process of insertion endwise it will be determined how much the component 20 is forced between the legs 26, 28. When it is desired to remove the component 20, the tapered locking members 36, 38 are driven out of their openings and the component 20 is withdrawn in a direction opposite from the direction of the arrow 33.

Prior to assembly, the component 20 is passed through the center of a plastic spool assembly carrying coil 51. There is an open space 54 between the edge 56 of component 20 and edge 58 of component 18 to permit the coil to be positioned in place.

It will be obvious that the openings 40, 42 or the member 36 may alternately be tapered, or otherwise formed, to the end that a secure locking engagement be achieved between the parts 20 and 18, thereby but wherein removal of the member 36, 38 is possible by mechanical means.

Although the present invention has been illustrated and described in connection with a single selected embodiment, it will be understood that this is illustrative of the invention and is by no means restrictive thereof. It is reasonably to be expected that those skilled in this art can make numerous revisions and adaptations which incorporate the herein disclosed principles will be included within the scope of the following claims as equivalents of the invention.

What is claimed is:

1. A core for an electromagnetic device comprising: two elongated core elements having adjoining tapered miter surfaces, complementary notches in the adjoining metal-to-metal contacting mitered surfaces of said core element; wedging means proportioned to fit endwise into the openings provided by said complementary notches and acting against said surfaces to bias the miter surfaces into tighter locking engagement and maintain said core elements in rigid relation.

2. A core construction in accordance with claim 1 wherein said wedging means is constituted as a non-metallic elongated member having tapered surfaces acting against the opposed surfaces of said complementary notches to hold the said core elements together.

3. A core construction in accordance with claim 2 including a number of windings of metallic conductor forming a coil on one of said core elements and which is provided therein before the two elements are joined together.

4. A two element core for electromagnetic devices comprising: a first element having end faces which are tapered to form flat angular surfaces having notches formed therein; a second element with tapered end faces proportioned to fit between the end faces of said first element to bridge the gap therebetween and having notches which are complementary with the notches in the faces of said first element; and locking means extending into openings provided by said notches and acting against the surfaces thereof to urge said two elements into further locking relation wherein said tapered faces are forced into a rigid tight locking relation.

5. The core construction in accordance with claim 4 wherein said locking means is constituted by a non-metallic member.

6. A magnetic core for electromagnetic devices comprising a member having a stack of laminations defining an incomplete flux path loop having ends, each said end having notches therein; a leg comprised of a stack of laminations fitting between the ends of said member forming a complete closed loop path for flux lines generated within the core, each end of said leg having notches complementary with adjoining notches of said member defining the incomplete flux path loop; a locking member disposed endwise within the openings defined by said notches in the respectively adjoining ends of said member and said leg compressively locking such ends together providing a butt joint for the passage of flux lines therebetween.

7. A core adapted for use in an electromagnetic device comprising two serially connected metallic members forming a closed loop magnetic flux path, comprising: a series of first laminations having end faces with angularly diverging tapered surfaces; a member also comprised of a series of second laminations disposed within the space bridging the space therebetween having end faces with angularly diverging and tapered surfaces; a wedge-shaped member disposed in openings formed by complementary notches in the adjoining tapered end face surfaces of said members compressively urging the said surfaces into tighter locking relation with each other.

References Cited

UNITED STATES PATENTS 2,294,322   8/1942   Van Der Woude __ 336—216 XR

FOREIGN PATENTS 1,105,377   6/1955   France.

LEWIS H. MYERS, *Primary Examiner.*

T. KOZMA, *Assistant Examiner.*